United States Patent Office 3,792,069
Patented Feb. 12, 1974

3,792,069
OXIDATION OF MERCURY TO MERCURIC AND MERCUROUS SALTS
William C. Baird, Jr., Westfield, John H. Surridge, Scotch Plains, and Ronald L. Hartgerink, Edison, N.J., assignors to Esso Research and Engineering Company, Linden, N.J.
No Drawing. Filed Nov. 9, 1971, Ser. No. 197,104
Int. Cl. C07f 3/10
U.S. Cl. 260—431          9 Claims

ABSTRACT OF THE DISCLOSURE

A process for oxidizing mercury metal to its mercurous or mercuric salts that employs the use of a nitrogen oxide species, $M_w(N_xO_y)_z$ wherein M is one selected from the group consisting of $NH_4$, tetra $C_1$–$C_6$ alkylammonium, tetra $C_1$–$C_6$ alkylphosphonium, hydrogen and any metal cation defined by the Periodic Table of the Elements; $w$ ranges from 0 to 2, $x$ is 1 or 2, $y$ ranges from 1 to 5 and $z$ ranges from 1 to 4, in the presence of air or oxygen.

---

This invention relates to the oxidation of metallic mercury to form either mercurous or mercuric salts. In one aspect, this invention relates to the preparation of mercuric acetate. In another aspect, this invention relates to the preparation of mercuric trifluoroacetate. In yet another aspect, this invention relates to the preparation of various mercury salts by either air or oxygen oxidation of mercury metal in trifluoroacetic acid catalyzed by nitrogen oxide species, followed by the addition of the appropriate anion to form a desired mercuric salt.

It is known in the prior art that mercury metal can be oxidized to form mercurous or mercuric salts.

The oxidation of metallic mercury to either its mercurous or mercuric salts has been described in various publications and patents. For instance, Frank P. Greenspan, in his U.S. Pat. No. 2,661,360 issued on Dec. 1, 1953, teaches that mercuric acetate can be formed by reaction of metallic mercury with preformed peracetic acid. He overcame the relative insolubility of metallic mercury in acetic acid by treating metallic mercury with peracetic acid in an acetic acid medium. While the metallic mercury was practically insoluble in acetic acid, it did dissolve in accordance with his invention in peracetic acid with the intermediate formation of mercurous acetate which was subsequently transformed into mercuric acetate by heating in the presence of peracetic acid.

However, the reaction of organic compounds with peracetic acid have shown that peracetic acid could be formed in situ in a reaction vessel by mixing together the organic compound to be reacted upon, acetic acid, and a strong acid catalyst to which is added a mixture of hydrogen peroxide.

Therefore, Donald G. MacKellar, in his U.S. Pat. 2,873,289 issued on Feb. 10, 1959, described the reaction wherein metallic mercury, acetic acid and a strong acid catalyst were agitated and hydrogen peroxide was added to the mixture while it was undergoing agitation. He found that addition of hydrogen peroxide to this mixture which contains large amounts of the heavy metal mercury did not result in wasteful destruction of the hydrogen peroxide but rather that substantially all of the active oxygen in the hydrogen peroxide was utilized in forming the mercuric acetate. Accordingly, he felt that this method provided an extremely efficient method for preparing mercuric acetate and further eliminates from the preparation of mercuric acetate the expensive and frequently hazardous operations of preparing, storing and shipping preformed peracetic acid. However, the use of a strong oxidizing agent, i.e. hydrogen peroxide, was still required in this method.

Certain Group VIII metal catalysts have been reported to catalyze the oxidation of mercury (I) salts to mercury (II) salts in aqueous systems. These catalysts, e.g., palladium on charcoal, are totally ineffective for the oxidation of mercury (0) to mercury (II) acetate in acetic acid, particularly under the mild oxidizing conditions of this invention.

Briefly, the subject invention comprises a method for oxidizing mercury to either its mercurous or mercuric salt form by reacting mercury metal with a liquid acid either in an air or oxygen atmosphere in the presence of a catalytic amount of a nitrogen oxide species, $M_w(N_xO_y)_z$ wherein M is one selected from the group consisting of $NH_4$, tetra $C_1$–$C_6$ alkyl ammonium, tetra $C_1$–$C_6$ alkylphosphonium, hydrogen and any metal cation defined by the Periodic Table of the Elements; $w$ ranges from 0 to 2, $x$ is 1 or 2, $y$ ranges from 1 to 5 and $z$ ranges from 1 to 4, in the presence of air or oxygen. This mercury oxidation process is simple and direct and can be operated over a wide range of conditions.

The temperature can be varied from 20° to 500° C., preferably from 25 to 100° C.

Air or oxygen can be supplied to the reaction at atmospheric pressure or can be charged at pressures up to 100 atmospheres or higher. The preferred range is from atmospheric to 20–30 atmospheres. It is to be understood that the concentration of the oxygen is such that it is maintained at a range from 0.5 to 1000 moles of oxygen, preferably from 1 to 100 moles of oxygen for each mole of mercury to be reacted. When air is supplied, it is to be understood that the amount of air is based upon the available oxygen contained therein.

The acid employed operates as both the solvent and the reactant. The acid is generally present in molar excess relative to the metallic mercury. The mole ratios of the acid ranges from 2 moles of acid to 2000 moles of acid per mole of mercury, preferably from 5 to 500 moles of acid per mole of mercury.

The order of addition of the reactants is not critical and the concentration ranges are broad.

Suitable acids for use in this invention include all carboxylic acids, RCOOH, which are liquids at reaction temperature and wherein R is hydrogen, $C_1$–$C_{20}$, preferably $C_2$–$C_{12}$ saturated acyclic and cyclic groups, or any partially or fully halogenated, saturated hydrocarbon. Such carboxylic acids are illustrated by, but not limited to, formic, acetic, propionic, butyric, isobutyric, valeric, trimethylacetic, caproic, heptylic, caprylic, pelargonic, cyclohexanecarboxylic, fluoroacetic, difluoroacetic, trifluoroacetic, chloroacetic, dichloroacetic, trichloroacetic, perfluoropropionic, and perfluorobutyric acid.

Also suitable are any sulfonic acids, $RSO_3H$, which are liquids at reaction temperature and where R is halogen or the radical of any saturated acyclic or cyclic hydrocarbons, or any partially or fully halogenated, saturated hydrocarbon. Such sulfonic acids are illustrated by, but not limited to, fluorosulfonic, chlorosulfonic, methanesulfonic, ethanesulfonic, trifluoromethanesulfonic and trichloromethanesulfonic acid.

Also suitable are various inorganic acids as illustrated by, but not limited to, sulfuric acid, phosphoric acid, hydrogen fluoride, hydrogen chloride, hydrogen bromide, hydrogen iodide, perchloric acid and water solutions of the above acids. It is within the scope of this invention that mixtures of the above acids may be employed.

The nitrogen oxide catalyst is characterized as follows: $M_w(N_xO_y)_z$ wherein M is one selected from the group consisting of $NH_4$, tetra $C_1$–$C_6$ alkyl ammonium, tetra $C_1$–$C_6$ alkylphosphonium, hydrogen and any metal cation defined by the Periodic Table of the Elements; $w$ ranges from 0 to 2, $x$ is 1 or 2, $y$ ranges from 1 to 5 and $z$ ranges from 1 to 4, in the presence of air or oxygen. The cation is a metal selected from Groups I–VIII of the Periodic Table. The cation is preferably either hydrogen, $NH_4$ or a metal selected from the group consisting of Li, Na, K, Mg, Ca, Cr, Mn, Fe, Cu, Al and Pb.

Preferably, the catalyst can be one selected from the group consisting of alkali, alkaline earth and Group VIII metal nitrates and alkali, alkaline earth and Group VIII metal nitrites and nitric acid.

The cation can be absent if $N_xO_y$ is a neutral species. Examples of such species are $N_2O$, $NO$, $N_2O_3$, $NO_2$, $N_2O_4$ and $N_2O_5$.

The quantity of catalyst based on the amount of available $N_xO_y$ ranges from 0.001 to 100 moles of catalyst per mole of mercury charged, preferably from 0.01 to 10 moles of catalyst per mole of mercury charged.

While the nitric oxide catalyst does oxidize the mercury metal to either the mercurous or mercuric state, in order to insure the oxidation of the mercury metal to its mercuric state the action, in some cases, is dependent upon the presence of a suitable cocatalyst, especially when the intermediate mercurous salt is insoluble. In the absence of this cocatalyst, the metallic mercury is oxidized relatively rapidly to the mercurous state but the reaction rate slows at this point and further oxidation to the mercuric state either occurs sluggishly or not at all. While the reaction could be accelerated by increasing the reaction temperature, this benefit is compromised by the fact that the mercuric state reacts with the carboxylic acid at temperatures above 100° C. to produce intractable mercurated acid when the solvent is a carboxylic acid with at least one hydrogen adjacent to the carboxyl group. The role of the cocatalyst then is to permit oxidation to mercuric ion to occur rapidly at those temperatures where mercuration of the carboxylic acid does not take place.

The cocatalyst is one selected from one of the following groups of metals:

(1) Group VIII metal salts of the type $QX_n$ where $Q$ is a Group VIII noble metal, $X$ is a halide ion and $n$ is an integer having a value ranging from 2 to 4. Representative salts are palladium dichloride, plantinum dichloride, palladium tetrachloride, platinum tetrachloride, rhodium trichloride, ruthenium trichloride. Palladium dichloride is a preferred salt.

(2) Soluble Group VIII metal complexes of the type $(R_3P)_mQX_n$ where $R_3P$ is an aryl, alkyl, or mixed aryl and alkyl phosphine ligand and R is a $C_1$–$C_8$ hydrocarbon radical; Q is a Group VIII noble metal, X is a halide anion, $m$ is an integer having a value ranging from 1 to 4, and $n$ has a value ranging from 0 to 2. Representative complexes are $[(C_6H_5)_3P]_2PtCl_2$, $[(C_6H_5)_3P]_3RhCl$, $$[(C_6H_5)_3P]_2PdCl_2$$

is a preferred complex.

(3) Group VIII metal salts as illustrated in (1) above supported on such inert supports as sulfonic acid resins, silica, alumina, charcoal, thoria, diatomaceous earth, molecular sieves, and other metal oxides wherein the amount of metal contained in the support ranges from 0.01–10% by weight of the metal based upon the total weight of said supported catalyst. Preferred supported cocatalysts are palladium chloride on sulfonic acid resins, on silica, on alumina, on charcoal, and on thoria.

(4) Certain inert substance, such as charcoal, silica, thoria, and other metal oxides. Charcoal and silica are preferred.

In the event that other mercuric salts are desired to be synthesized other than the salts of the particular acid employed in the above-described reaction, it is within the scope of this invention that the addition of certain anions to solutions of mercury salts in trifluoroacetic acid causes the immediate and quantitative precipitation of the mercury salt corresponding to the anion of the acid added, by following the teaching of G. S. Fujioka and G. H. Cady, J. Am. Chem. Soc. 79, 2451 (1957). Useful acids include $HClO_4$, $H_2SO_4$, $SO_3$, $H_2S$, and $HCl$.

The mercuric salts produced by the subject process have utility in very many areas.

For instance, olefinic and aromatic hydrocarbons combine readily with various mercuric salts in appropriate media to produce organomercury compounds. The ease of generating organomercurials from these substrates make these compounds attractive candidates for achieving hydrocarbon functionalization. The reaction of olefins with mercuric salts in a number of reactive solvents is known generally as solvomercuration, a reaction that gives rise to β-substituted alkyl mercury salts. Reduction of the carbon-mercury bond yields the corresponding 2-substituted alkanes and metallic mercury. These reactions are demonstrated in the following equations:

(1) 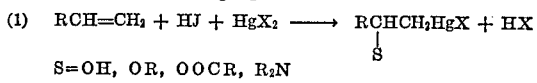

$S=OH, OR, OOCR, R_2N$ (2) 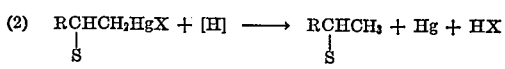

Mercuration of aromatics produces arylmercury salts which are also reactive compounds. Carbonylation in alcoholic media gives aryl esters and metallic mercury. For solvomercuration of olefins and mercuration of aromatics mercury trifluoroacetate is a particularly preferred mercury salt. This preference is attributed to the fact that mercuric trifluoroacetate reacts rapidly and efficiently with the unsaturated hydrocarbons. Furthermore, this salt is unique among mercury salts for it is readily soluble in a variety of common organic solvents, which generally extend its utility as a reactant for hydrocarbon functionalization. The carbonylation reaction is demonstrated by the following equation:

(3)

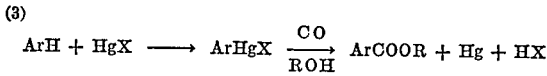

It is quite apparent that mercuric trifluoroacetate affords great potential for organic synthesis. However, useful synthetic reactions are currently not practical, for they generally occur with the conversion of the mercuric trifluoroacetate to metallic mercury. The loss of mercury from the system in this way is both a serious economic debit and of environmental concern. Therefore, the process of the subject invention permits the recovery and regeneration of mercury metal in a form suitable for recycle into reactions illustrated by Equations 1 through 3.

Mercury metal is oxidized directly to the mercuric trifluoroacetate by air oxygen as described hereinabove. The conversion of the metal mercury to the mercuric anion is quantitative, no other organic or inorganic byproducts are formed. The reaction is totally dependent upon the addition of a catalytic quantity of the species $M_w(N_xO_y)_z$. In the absence of this catalyst essentially no mercury oxidation occurs under the mild conditions required by the subject process.

The total reaction for oxidizing the mercury metal to its mercury salt and then recycling is demonstrated in the following equations:

(4a)

$$2Hg + NO_2 + 2HOAc \longrightarrow Hg_2(OAc)_2 + NO + H_2O$$

(4b)

$$2NO + O_2 \longrightarrow NO_2$$

(4c)

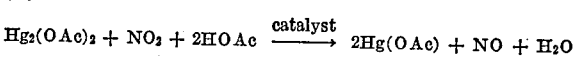

While the air or oxygen is the actual oxidizing agent consumed, its function is to continuously regenerate active $M_w(N_xO_y)_z$ via reaction (4b) so it is observed that the subject invention forms a useful tool for regenerating the mercuric salt for use in these carbonylation reactions. The carbonylation reaction is described in greater detail in a copending application bearing Ser. No. 233,338 filed Mar. 9, 1972.

The invention is demonstrated by the following examples:

EXAMPLE 1

In a typical experiment a 50 ml. glass reactor was charged with 20 ml. of acetic acid, 0.97 g. (4.8 mmole) of mercury, 0.02 g. of concentrated nitric acid (0.23 mmole), and 40 mg. (0.05 mmole) of bis-(triphenyl phosphine) platinum (II) chloride. The reaction was charged with oxygen to 60 p.s.i.g. and was then agitated at 65° C. for 24 hours. The clear solution was titrated with standard sodium thiocyanate and was shown to contain 4.6 meq. of mercury (II) acetate corresponding to a 96% yield. The acetic acid was removed on a rotary evaporator and the crystalline residue was analyzed.

Calculated for $C_4H_6O_4Hg$ (percent): C, 15.07; H, 1.90; Hg, 62.95.
Found (percent): C, 15.42; H, 1.82; Hg, 62.73.

A sample of mercury (II) acetate was reacted with benzene in acetic acid. From this reaction was isolated phenylmercury acetate which was shown to be identical to an authentic sample by comparative analytical techniques.

EXAMPLES 2-17

The basic procedure of Example 1 was followed. These examples illustrate the utility of certain catalysts, the ineffectiveness of others, concentration ranges, and reaction conditions.

EXAMPLE 18

To 1.0 g. of the sodium salt of Amberlyst 15 resin (trademark of Rohm & Haas Corp.) was added 0.088 g. of palladium (II) chloride in 25 ml. of water. The suspension was agitated at room temperature for 16 hours. A second charge of 0.088 g. of palladium (II) chloride was added, and agitation was continued for 3 hours. The resin was filtered and washed with 500 ml. of water and 500 ml. of methanol. The resin was dried at room temperature at 150 mm. Analysis for Pd: 2.14%.

A glass reactor was charged with 1.00 g. of mercury (0), 22 ml. of acetic acid, 0.060 g. of nitric acid, and 0.50 g. of palladium resin. The reactor was pressurized to 60 p.s.i.g. with oxygen and was heated at 70° C. for 20 hours. The yield of mercury (II) acetate was 87%. The recovered palladium resin (0.66 g.) was recycled to a second identical mercury (0) oxidation; the mercury (II) acetate yield was 79%. The recovered resin (0.70 g.) was recycled to a third oxidation; an 88% yield of mercury (II) acetate was obtained. The recovered resin (0.60 g.) contained 0.41% Pd and 38.17% Hg.

EXAMPLE 19

To 2.0 g. of Amberlyst 15 resin was added 1.77 g. of palladium (II) chloride in 50 ml. of water. The mixture was stirred at 100° C. for 3 hours and the resin was washed and dried as in Example 18. The resin contained 10.97% Pd. The oxidation of mercury (0) was carried out as in Example 18 using 0.2 g. of palladium resin; the yield of mercury (II) acetate was 80%. The recovered catalyst (0.32 g.) was recycled to a second oxidation which yielded 89% mercury (II) acetate. The recovered resin (0.36 g.) contained 3.26% Pd and 44.06% Hg.

Control experiments were performed according to the procedure of Example 18 utilizing 0.50 g. of Amberlyst 15 or 0.50 g. of the sodium salt of the resin. No conversion of mercury (0) to mercury (II) acetate occurred.

EXAMPLE 20

A stock solution of palladium (II) chloride was prepared by dissolving 1.23 g. of the salt in 3 ml. of concentrated hydrochloric acid and 33.5 ml. of water. This solu-

TABLE I

| | Reactants | | | | Catalysts | | | Reaction conditions | | Products | | | | Conversion (percent) | |
|---|---|---|---|---|---|---|---|---|---|---|---|---|---|---|---|
| Example | Hg(O), g. | CH₃COOH, ml. | O₂, p.s.i.g. | HNO₃, g. | Metal catalyst | Mg. | Mmole | Time, hr. | Temp., °C. | Hg(O), g. | Hg₂(OOCCH₃)₂, g. | Hg(OOCCH₃)₂, g. | Hg(OOCCH₃)₂, meq. | Hg(O)–Hg(I) | Hg(O)–Hg(II) |
| 2 | 3.88 | 200 | ¹90 | — | — | — | — | 5 | 100 | 3.88 | 0 | 0 | 0 | 0 | 0 |
| 3 | 3.88 | 90 | ¹90 | 0.065 | — | — | — | 5 | 160 | 2.74 | 1.47 | 0 | 4.1 | 29 | 21 |
| 4 | 3.96 | 150 | ¹95 | 0.065 | — | — | — | 20 | 70 | 0.8 | 1.00 | 0 | 0 | 9.8 | 0 |
| 5 | 4.03 | 150 | ¹95 | (²) | — | — | — | 22 | 70 | 4.03 | 0 | 0 | 0 | 0 | 0 |
| 6 | 1.06 | 20 | 60 | 0.020 | (ϕ₃P)₄Pd | 65 | 0.056 | 21 | 65 | 0 | 0 | 0 | 5.2 | — | 100 |
| 7 | 0.94 | 20 | 60 | 0.020 | PdCl₂ | 15 | 0.084 | 4 | 65 | 0 | 0 | 0 | 4.7 | — | 100 |
| 8 | 1.06 | 20 | 60 | 0.020 | PdCl₂ | 10 | 0.056 | 18 | 65 | 0 | 0 | 0 | 4.4 | — | 98 |
| 9 | 0.97 | 20 | 60 | 0.020 | (ϕ₃P)₂PdCl₂ | 10 | 0.014 | 18 | 62 | 0 | 0 | 0 | 5.1 | — | 100 |
| 10 | 1.05 | 20 | 60 | 0.020 | (ϕ₃P)₂PtCl₂ | 40 | 0.051 | 23 | 65 | 0 | 0 | 0 | 4.6 | — | 98 |
| 11 | 1.04 | 20 | 60 | 0.020 | (ϕ₃P)₄Pt | 80 | 0.064 | 19 | 66 | 0 | 0 | 0 | 2.0 | — | 40 |
| 12 | 1.01 | 20 | 60 | 0.020 | (ϕ₃P)₃RhCl | 50 | 0.054 | 18 | 62 | 0 | 0.8 | 0 | 0 | 3.8 | 0 |
| 13 | 1.08 | 20 | 60 | 0.020 | (ϕ₃P)₃CuOOCCF₃ | — | 0.052 | 16 | 68 | 0.14 | 1.32 | 0 | 0 | 98 | 0 |
| 14 | 1.01 | 20 | 60 | 0.020 | V₂O₅ | 12 | 0.066 | 19 | 62 | 0.13 | 1.10 | 0 | 0 | 88 | 0 |
| 15 | 1.01 | 20 | 60 | 0.020 | MnCl₂ | 18 | 0.091 | 23 | 65 | 0.21 | 1.05 | 0 | 0 | 87 | 0 |
| 16 | 1.09 | 20 | 60 | 0.020 | AgOOCCH₃ | 15 | 0.090 | 20 | 65 | 0.25 | 0.97 | 0 | 0 | 79 | 0 |
| 17 | 0.40 | 10 | ¹80 | 0.010 | (ϕ₃P)₂PdCl₂ | 7 | 0.010 | 20 | 65 | 0 | 0 | 0.94 | (³) | 77 | 100 |

¹ Air.  ² 0.120 HClO₄.  ³ 0.65 g.

tion was used in the preparation of the following supported catalysts:

(A) To 10 g. of aluminum oxide (Merck) was added 7.7 g. of the palladium chloride solution. The catalyst was dried on a rotary evaporator at 85° (30 mm.). A large sample was washed twice with 10 ml. of acetic acid and was dried for 16 hours at 100° (150 mm.). Analysis for Pd: 0.96%.

(B) To 10 g. of silica gel, 28–200 mesh, grade 12 (Fisher Scientific Co.) was added 11 g. of the palladium chloride solution. The catalyst was treated as in (A). Analysis for Pd: 1.00%.

(C) To 5 g. of Norite A was added 5 g. of the palladium chloride solution. The catalyst was manipulated as in (A). Analysis for Pd: 1.76%.

EXAMPLE 21

To a glass reactor were charged 1.02 g. of mercury (0), 17 ml. of acetic acid, 0.04 g. of nitric acid, and 2 g. of catalyst 20A. The reactor was pressurized with oxygen to 60 p.s.i.g. and heated at 75° for 4 hours. The yield of mercury (II) acetate was 94%.

EXAMPLE 22

The procedure of Example 21 was repeated using 2 g. of catalyst 20B. The yield of mercury (II) acetate was 94%. The recovered catalyst (20B) was recycled into three consecutive mercury (0) oxidations. Reaction periods and yields were as follows: 7 hr., 94%; 21 hr., 100%; 22 hr., 91%. The catalyst recovered from the fourth reaction contained ~0.05% Pd.

EXAMPLE 23

The procedure of Example 21 was repeated utilizing 2 g. of catalyst 20C. The yield of mercury (II) acetate was 86%. The recovered catalyst was recycled three additional times. Reaction times and yields were as follows: 21 hr., 60%; 18 hr., 80%; 20 hr., 86%. The catalyst recovered from the final run contained 0.94% Pd.

Silica gel was acid-washed several times with concentrated hydrochloric acid; the silica gel was subsequently dried on a rotary evaporator at 75° C. (30 mm.). A reactor was charged with 2 g. of silica gel, 1.02 g. of mercury (0), 0.04 g. of nitric acid, 17 ml. of acetic acid, and 63 p.s.i.g. of oxygen. The reaction was heated at 75° for 64 hrs. to give an 86% yield of mercury (II) acetate.

EXAMPLE 25

A glass reactor was charged with 2 g. of Norite A, 0.90 g. of mercury (0), 0.04 g. of nitric acid, 15 ml. of acetic acid, and 60 p.s.i.g. oxygen. The reactor was heated at 75° for 22 hrs. to give 0.7 g. of mercury (I) acetate and a 35% yield of mercury (II) acetate.

EXAMPLE 26

Into a Parr 4500 pressure reactor of 1 l. capacity were placed 4.06 g. (20.2 mmole) of mercury, 150 ml. of trifluoroacetic acid, and 0.045 g. of concentrated nitric acid (0.57 mmole). The reactor was pressurized with air to 70 p.s.i.g. at 20° C. The reactor was heated and stirred at 150° C. for 3 hrs.; the pressure rose to a maximum of 245 p.s.i.g. The reactor contents consisted of a clear, pale orange solution; no mercury metal was present. An aliquot of the solution was titrated for mercury (II) by 0.1 N sodium thiocyanate solution; the titration found 20.2 mmole of mercury (II) which was equivalent to 100% conversion of mercury metal. The trifluoroacetic acid was removed by atmospheric distillation to give 8.3 g. (98%) of mercury (II) trifluoroacetate.

*Analysis.*—Calculated for $C_4F_6O_4Hg$ (percent): C, 11.25; Hg, 47.01. Found (percent): C, 11.87; Hg, 45.90.

A sample of the mercury (II) trifluoroacetate prepared above was stirred with benzene at room temperature overnight. From the benzene solution was isolated a quantitative yield of phenylmercury trifluoroacetate, which was shown to be identical to an authenic sample.

EXAMPLES 27–31

In Examples 27–31, the procedure of Example 26 was repeated. The table summarizes the influence of various reaction variables. Air was the oxidant in all cases.

TABLE II

| Example: | G. Hg (mmole) | $CF_3COOH$ | Catalyst (mmole) | Temp. (° C.) | Press. (p.s.i.g.) | Time (hr.) | Yield $Hg(OOCCF_3)$ (percent) |
|---|---|---|---|---|---|---|---|
| 27 | 2.0 (10) | 300 g. |  | 25 | 80 | 1.5 | 0 |
| 28 | 2.0 (10) | 300 g. |  | 80 | 110 | 1.5 | 0 |
| 29 | 1.0 (5) | 300 g. | 10% Pd/C (0.28) | 125 | 160 | 2 | 0 |
| 30 | 3.2 (16) | 150 ml. | $HNO_3$ (5.6) | 150 | 245 | 3 | 99 |
| 31 | 2.0 (10) | 150 ml. |  | 150 | 245 | 3 | 0 |

EXAMPLE 32

To a 1 l. flask were added 4.16 g. (20.8 mmoles) of mercury, 150 ml. of trifluoroacetic acid, and 0.043 g. (0.48 mmole) of nitric acid. A 1500 ml. air reservoir was attached, and the reaction was stirred at room temperature for 16 hr. Titration with sodium thiocyanate showed a 100% yield of mercury (II) trifluoroacetate.

EXAMPLE 33

A 50 ml. glass pressure tube was charged with 0.91 g. (4.5 mmole) of mercury, 25 ml. of trifluoroacetic acid, 0.02 g. of concentrated nitric acid (0.22 mmole) and oxygen (60 p.s.i.g.). The tube was shaken at room temperature for 2–3 hrs. during which time the pressure fell to 38 p.s.i.g. A 98% yield of mercury (II) trifluoroacetate was recovered.

EXAMPLE 34

The procedure of Example 8 was repeated using 1.02 g. (5 mmole) of mercury, 5 ml. of trifluoroacetic acid, 0.04 g. of concentrated nitric acid (0.45 mmole) and 60 p.s.i.g. oxygen. After 1 hr. at room temperature a 100% yield of mercury (II) trifluoroacetate was obtained.

EXAMPLE 35

The procedure of Example 8 was repeated except that 0.02 g. of concentrated sulfuric acid was substituted for nitric acid. After 3 hrs. at room temperature no reaction had occurred. The reactor tube was subsequently heated at 80° C., for 4 hrs. No oxidation of the mercury was detected.

EXAMPLE 36

The procedure of Example 8 was repeated using 0.02 g. of 70% perchloric acid as the catalyst. No reaction occurred after 3 hrs. at room temperature and 4 hrs. at 80° C.

EXAMPLE 37

Into a 40 ml. glass bomb was charged 0.540 g. (2.95 mmoles) mercury metal, 0.012 g. (0.07 mmole) calcium nitrate 0.024 g. (0.14 mmole) palladium dichloride and 10 ml. glacial acetic acid. The bomb was flushed with oxygen, pressurized with oxygen to 44 p.s.i., and shaken for 4 hours at 65° C. A thiocyanate titration of the clear solution showed 95% reaction to mercuric ion.

EXAMPLES 38–42

Examples 38–42 are tabulated in Table III and were carried out and analyzed exactly as described in Example 37.

TABLE III $Hg° \rightarrow Hg^{++}$ with $NO_x$ catalysis, 10 ml. $CH_3COOH$ at 65° C. and 44 p.s.i. $O_2$ for 4 hrs.

| Example | Hg° Wt. (g.) | Hg° Mmoles | $NO_x$ Wt. (g.) | $NO_x$ Mmoles | $Pd(Cl)_2$ Wt. (g.) | $Pd(Cl)_2$ Mmole | Percent reaction |
|---|---|---|---|---|---|---|---|
| 38 | 0.513 | 2.56 | $NaNO_3$ 0.008 | 0.1 | 0.007 | 0.04 | 95 |
| 39 | 0.590 | 2.95 | $Ca(NO_3)_2$ 0.012 | 0.07 | 0.02 | 0.14 | 95 |
| 40 | 0.650 | 3.25 | $Fe(NO_3)_3 \cdot 9H_2O$ 0.01 | 0.025 | 0.01 | 0.07 | 96 |
| 41 | 0.652 | 3.26 | $NO_2$ 0.01 | 0.2 | 0.01 | 0.07 | 98 |
| 42 | 0.630 | 3.15 | $NaNO_2$ 0.02 | 0.3 | 0.01 | 0.07 | 95 |

EXAMPLE 43

Into a 500 ml. round-bottom flask was charged 0.633 g. (3.16 mmoles) of mercury metal, 0.008 g. (0.1 mmole) sodium nitrate, 10 ml. of trifluoroacetic acid and a magnetic stirrer. The flask was stoppered and stirred for 16 hours at room temperature (25° C.). The clear solution was titrated with thiocyanate which showed 100% conversion to mercuric ion.

EXAMPLES 44–48

Examples 44–48 are tabulated in Table IV and were carried out and analyzed exactly as described in Example 43.

TABLE IV $Hg° \rightarrow Hg^{++}$ With $NO_x$ catalysis, 10 ml. $CF_3COOH$, room temperature

| Example | Hg° Wt. (g.) | Hg° Mmoles | $NO_x$ Wt. (g.) | $NO_x$ Mmoles | Time (hr.) | Percent reaction |
|---|---|---|---|---|---|---|
| 44 | 0.637 | 3.18 | $Ca(NO_3)_2$ 0.008 | 0.05 | 16 | 100 |
| 45 | 0.640 | 3.20 | $Fe(NO_3)_3$ 0.008 | 0.02 | 16 | 100 |
| 46 | 0.645 | 3.22 | $Pd(NO_3)_2$ 0.007 | 0.03 | 40 | 27 |
| 47 | 0.673 | 3.36 | $NaNO_2$ 0.007 | 0.1 | 40 | 22 |
| 48 | 0.962 | 4.81 | $NO_2$ 0.005 | 0.1 | 16 | 100 |
| 49 | 0.970 | 4.74 | $Bi(NO_3)_3 \cdot 5H_2O$ 0.040 | 0.083 | 18 | 99 |
| 50 | 1.055 | 5.26 | $Al(NO_3)_3 \cdot 9H_2O$ 0.031 | 0.083 | 18 | 100 |
| 51 | 1.012 | 5.04 | $Cr(NO_3)_3 \cdot 9H_2O$ 0.033 | 0.083 | 18 | 97 |
| 52 | 0.978 | 4.87 | $Pb(NO_3)_2$ 0.041 | 0.125 | 18 | 100 |
| 53 | 0.995 | 4.96 | $Mn(NO_3)_2$* 0.044 | 0.125 | 18 | 98 |

*$Mn(NO_3)_2$ added as 50% water solution.

EXAMPLE 54

A 40 ml. glass bomb was charged with 1.01 g. (5 mmoles) mercury metal, 10 ml. of trifluoromethane sulfonic acid, 0.050 ml. concentrated nitric acid, 40 p.s.i. oxygen and shaken at room temperature. After 24 hours, all mercury metal had disappeared leaving a white solid which was shown to be mercurous trifluoromethanesulfonate, $Hg_2(O_3SCF_3)_2$.

EXAMPLE 55

A 500 ml. round-bottom flask was charged with 2.0 g. (10 mmoles) mercury metal, 0.017 g. (0.2 mmoles) sodium nitrate and 20 ml. of 96% sulfuric acid. The flask was stoppered and the contents vigorously stirred magnetically at room temperature. After 24 hours, all the mercury metal had disappeared leaving a white solid analyzing for mercurous sulfate, $Hg_2SO_4$.

EXAMPLE 56

Exactly as in Example 55 except solvent was concentrated hydrochloric acid. All mercury metal disappeared after 24 hours leaving a white solid analyzing as mercuric chloride, $HgCl_2$.

EXAMPLE 57

A 500 ml. round-bottom flask was charged with 2.0 g. (10 mmoles) mercury metal, 0.017 g. (0.2 mmoles) sodium nitrate and 20 ml. of trifluoroacetic acid. The flask was stoppered and the contents vigorously stirred magnetically for 16 hours. The flask was then opened and to the clear solution at room temperature was added, in turn, 2.1 g. (10 mmoles) of trifluoroacetic anhydride and 3.0 g. (20 mmoles) of trifluoromethanesulfonic acid. The fine, white precipitate formed was collected by filtration, washed once with a little trifluoroacetic acid and dried in vacuo to yield 4.7 g. (94% yield) of a white powder with an equivalent weight of 249 by thiocyanate titration (calculated for $Hg(O_3SCF_3)_2$, 249). The preparation of the salts shown in Table V were carried out according to the procedures of Example 57.

TABLE V

Preparation of mercuric salts in $CF_3COOH$ from mercury metal

| Reagent added to $Hg(O_2CCF_3)_2$ in $CF_3COOH$: | Product |
|---|---|
| HCl | $HgCl_2$ |
| $H_2S$ | HgS |
| $HClO_4$ | $Hg(ClO_4)_2$ |
| $H_2SO_4$ | $HgSO_4$ |
| $SO_3$ | $HgSO_4$ |

EXAMPLES 58–60

Examples 58–60 are tabulated in Table VI and were carried out and analyzed exactly as described in Example 43 with the exception that the solvent comprised a mixture of various acids rather than being a single acid.

TABLE VI $Hg° \rightarrow Hg^{++}$ with $NO_x$ catalysis at room temperature for 18 hours

| Example | Hg° Wt. (g.) | Hg° Mmoles | $NO_x$ catalyst Wt. (g.) | $NO_x$ catalyst Mmole | Solvent | Yield, $Hg^{++}$ |
|---|---|---|---|---|---|---|
| 58 | 1.02 | 5.1 | $NaNO_3$ 0.03 | 0.37 | Acetic acid (5 ml.) / Trifluoroacetic acid (5 ml.) | 96 |
| 59 | 1.00 | 5.0 | $HNO_3$ 0.015 | 0.22 | Acetic acid (7 g.) / Trichloroacetic acid (7 g.) | $Hg^{++}$ 40% |
| 60 | 1.00 | 5.0 | $HNO_3$ 0.015 | 0.22 | Acetic acid (9 ml.) / Trifluoroacetic acid (1 ml.) | $Hg^{++}$ 40% |

What is claimed is:

1. A process for oxidizing metallic mercury to either a mercuric or mercurous organic salt, said process consisting of the step of reacting said metallic mercury with an organic acid, said acid being one selected from the group consisting of HCOOH, RCOOH and $RSO_3H$, wherein R is either a $C_1$ to $C_{20}$ saturated acyclic or cyclic hydrocarbyl group or a partially or fully halogenated saturated hydrocarbyl group, in the presence of either air or oxygen and a catalyst characterized as follows: $M_w(N_xO_y)_z$ wherein M is one selected from the group consisting of $NH_4$, tetra $C_1$–$C_6$ alkylammonium, tetra $C_1$–$C_6$ alkylphosphonium, hydrogen and any metal cation defined by Groups I–VIII of the Periodic Table of the Elements; $w$ ranges from 0 to 2, $x$ is 1 or 2, $y$ ranges from 1 to 5 and $z$ ranges from 1 to 4.

2. A process according to claim 1 wherein said acid is present in the amount ranging from 2 to 200 moles of acid per mole of said mercury metal.

3. A process according to claim 1 wherein the concentration of oxygen ranges from 0.5 to 1000 moles of oxygen per each mole of mercury metal.

4. A process according to claim 1 wherein said reaction is carried out in the presence of air.

5. A process according to claim 1 wherein said catalyst is one selected from the group consisting of alkali, alkaline earth, and Group VIII metal nitrates and alkali, alkaline earth and Group VIII metal nitrites and nitric acid.

6. A process according to claim 1 wherein $N_xO_y$ is either NO or $NO_2$.

7. A process according to claim 1 wherein said reaction is carried out in the presence of a cocatalyst, said cocatalyst being one selected from the group consisting of:
   (1) Group VIII metal salts of the type $QX_n$ wherein Q is a Group VIII noble metal and X is a halide ion, and $n$ is an integer having a value ranging from 2 to 4;
   (2) soluble Group VIII metal complexes characterized by the formula $(R'_3P)_mQX_n$ wherein R' is a $C_1$–$C_8$ alkyl, $C_6$–$C_{10}$ aryl or combinations thereof, phosphine ligand; Q is a Group VIII noble metal, X is a halide anion and $n$ is an integer having a value ranging from 1 to 4 and $m$ has a value ranging from 0 to 2;
   (3) Group VIII metal salts supported on inert supports, said support being one selected from the group consisting of sulfonic acid, resin, silica, alumina, charcoal, thoria, diatomaceous earth and metal oxides, wherein the amount of metal contained in the support ranges from 0.01 to 10% by weight of free metal based upon the total weight of said supported catalyst; and
   (4) inert substances selected from the group consisting of charcoal, silica, thoria and metal oxides.

8. A process according to claim 7 wherein said cocatalyst is $[(C_6H_3)_3P]_2PdCl_2$.

9. A process according to claim 1 wherein said acid is perfluoroacetic acid.

References Cited

UNITED STATES PATENTS

| | | | |
|---|---|---|---|
| 2,873,289 | 2/1959 | MacKellar | 260—431 |
| 2,661,360 | 12/1953 | Greenspan | 260—431 |
| 3,390,956 | 7/1968 | Fielding et al. | 260—431 X |

OTHER REFERENCES

Fujioka et al., J. Am. Chem. Soc. Vol. 79, pp. 2451 to 2454 (1957).

DANIEL E. WYMAN, Primary Examiner

A. P. DEMERS, Assistant Examiner

U.S. Cl. X.R.

423—305, 468, 476, 491, 544, 561